United States Patent [19]

Iwashita

[11] Patent Number: 4,611,896
[45] Date of Patent: Sep. 16, 1986

[54] ELECTRICALLY-DRIVEN CAMERA

[75] Inventor: Tomonori Iwashita, Kanagawa, Japan

[73] Assignee: Canon Kabushiki Kaisha, Tokyo, Japan

[21] Appl. No.: 582,456

[22] Filed: Feb. 22, 1984

[30] Foreign Application Priority Data

Feb. 28, 1983 [JP] Japan ................................. 58-30697

[51] Int. Cl.⁴ .......................... G03B 1/00; G03B 17/42
[52] U.S. Cl. ................. 354/173.11; 354/206; 354/214
[58] Field of Search ........ 354/173.1, 173.11, 204–206, 354/213, 214

[56] References Cited

U.S. PATENT DOCUMENTS

| 4,222,651 | 9/1980 | Urano et al. | 354/214 |
| 4,297,019 | 10/1981 | Yagi et al. | 354/173.11 |
| 4,324,469 | 4/1982 | Harvey | 354/214 |
| 4,392,730 | 7/1983 | Iwashita et al. | 354/214 X |
| 4,400,074 | 8/1983 | Akiyama et al. | 354/217 X |
| 4,457,605 | 7/1984 | Yamamoto et al. | 354/214 X |
| 4,466,719 | 8/1984 | Haraguchi et al. | 354/214 X |

Primary Examiner—William B. Perkey
Attorney, Agent, or Firm—Toren, McGeady, Stanger, Goldberg & Kiel

[57] ABSTRACT

An electrically-driven camera performing film winding and rewinding with a motor is arranged to automatically perform a film rewinding operation after finishing an unfinished charging portion of a film winding and shutter charging process in carrying out the film rewinding operation when a roll of film comes to the end thereof halfway in the winding and charging process.

2 Claims, 5 Drawing Figures

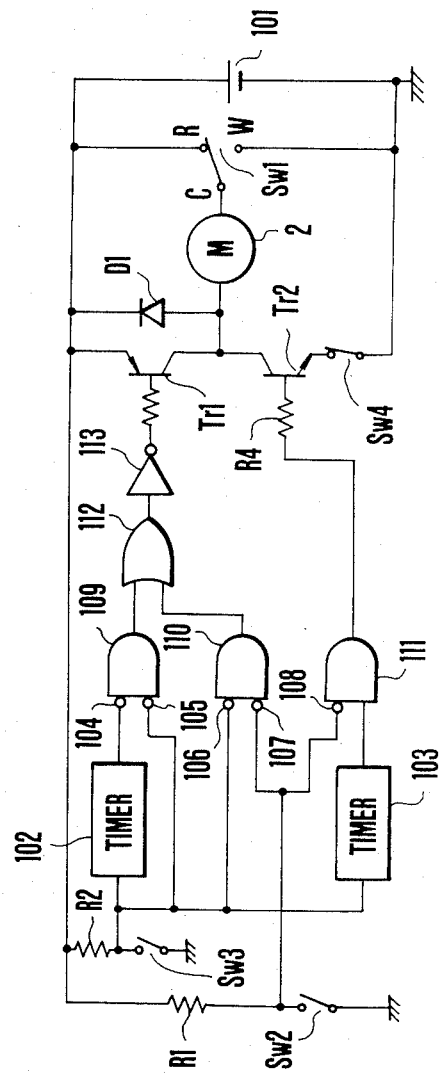
F I G. 5

ELECTRICALLY-DRIVEN CAMERA

BACKGROUND OF THE INVENTION

1. Field of the Invention

This invention relates to an electrically-driven camera and more particularly to a camera arranged to perform film winding and rewinding with a motor.

2. Description of the Prior Art

Electrically-driven cameras of the kind performing film winding and rewinding with a motor have hitherto employed various operating methods for shifting a film winding operation by the motor to a film rewinding operation by the motor. These methods of the prior art include:

(1.) A method in which a frame counter is arranged to preset a given number of frames of film. When the film is wound up to an extent corresponding to the given number of frames, film winding is ended. Then, a stroket is disengaged and the film is rewound by operating an operation member.

(2.) A method in which the tension of film developing at the end of winding of the film loaded is detected to end thereby the film winding operation. Then, a sprocket is disengaged and the film is rewound by operating an operation member.

(3.) An automatic rewinding method in which the tension of film developing at the end of the film loaded is detected to end the film winding operation and then to automatically rewind the film by shifting a driving sysyem.

Meanwhile, in the single-lens reflex camera of the kind arranged to be capable of film winding and rewinding with a motor, an operation whereby a mirror which has been retracted at the time of an exposure is brought back to its view finder forming position is arranged to be accomplished in association with film winding. However, when the above-stated winding-to-rewinding shifting methods (2) and (3) are applied to the cameras of that kind, there arises the following inconvenience: Since the film winding operation is arranged to be brought to an end by the film tension which develops when the whole film loaded has been wound up, the winding phase of the camera at the end of the film varies with the length of the film. Therefore, in case that the film comesto the end thereof in the beginning of a winding process being performed by a camera of the above-stated kind, the winding operation sometimes comes to an end before the mirror is brought back to the view finder forming position. In that event, the camera leaves the mirror in its retracted position. As a result, light is left applied for a long period of timeto the shutter curtain. This not only eventually causes a lekage of light but also, under some extreme condition, might burn the shutter curtain. Further, with the mirror remaining in the retracted position, the view finder is dark and disagreeable to the photographer. Besides, in accordance with the methods (2) and (3), when the camera comes to a stop halfway in the film winding process, the internal mechanism of the camera is left under an unnecessarily loaded condition which affects the internal mechanism even if the camera is not of the above-stated kind having the mirror arranged to be released by a film winding operation.

Another problem of these methods resides in that: When the film is rewound with the winding operation stopped halfway in the winding process, the initial winding extent comes to vary in loading the camera with a new roll of film. This is undesirable because the extent of film feeding by perforation becomes inconstant.

To solve these problems, the present applicant has previously disclosed an invention in U.S. patent application Ser. No. 295,327, filed Aug. 24, 1981, now abandoned. In accordance with the previous invention, the internal mechanism of a camera incorporating a driving motor therein is forcedly shifted to a winding completed state by operating a ewinding operation member, without feeding the film any further, when a winding operation is brought to a stop halfway in a film winding process as the remainder of film becomes small; and a quick return mirror is thus unfailingly moved down to prevent shutter blades or curtains from being damaged and to prevent an accidental exposure to light of the whole roll of film during a film rewinding process. However, the previousinvention has the following shortcoming: In accordance with the method of the invention, the driving force of a film winding motor is arranged to be transmitted to a sprocket by continuously depressing a rewinding operation member in such a way as to cause a switch to allow current supply to the motor. The photographer is thus required to continuously push the rewinding member in carrying out a film rewinding operation when charging is unfinished. However, this is not desirable for the operability of the camera.

SUMMARY OF THE INVENTION

It is a principal object of the present invention to impart an improved operability to an electrically-driven camera of the above-stated kind. To attain this object, it is a more specific object of the invention to provide an electrically-driven camera in which: When a roll of film comes to the end thereof halfway in a film winding process, a winding action can be performed to finish an unfinished charging portion of the motor-driven winding operation by just once pushing a film rewinding operation member.

It is another object of the invention to provide an electrically-driven camera wherein there is provided an additional function of performing a film rewinding operation with a motor; and, when a roll of film comes to the end thereof halfway in a film winding process, a winding action can be performed to finish an unfinished charging portion of a motor-driven winding operation by just once pushing a film rewinding operation member.

These and further objects and features of the invention will become apparent from the following detailed description of a preferred embodiment thereof taken in connection with the accompanying drawings.

BRIEF DESCRIPTION OF THE DRAWINGS

FIG. 5 is a circuit diagram showing the circuit arrangement of the electrically-driven camera.

DETAILED DESCRIPTION OF THE PREFERRED EMBODIMENT

Figure 1:
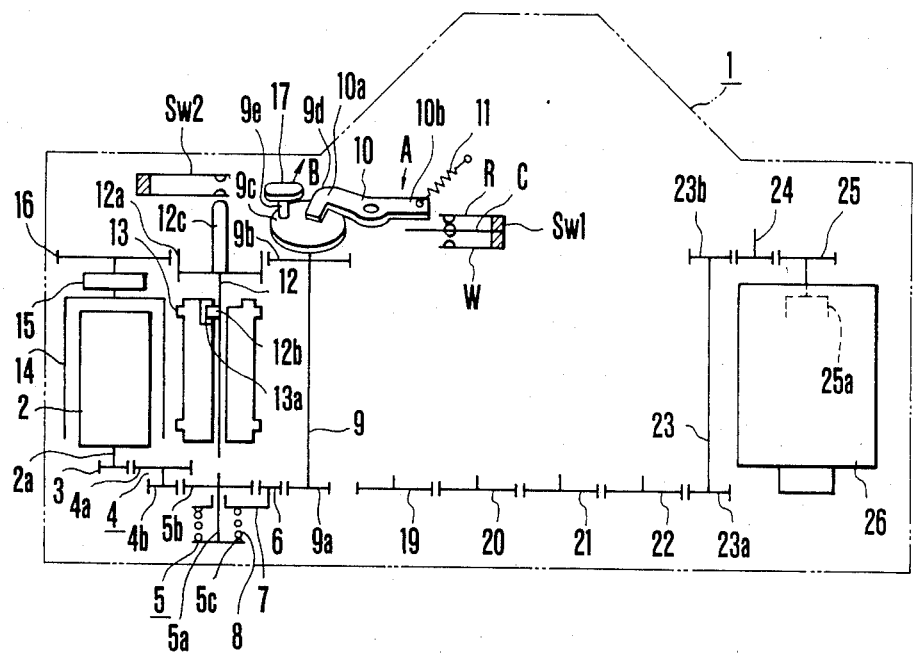
FIG. 1 is a front view showing the structural arrangement of the film winding and rewinding mechanism of an electrically-driven single-lens reflex camera according to the present invention.
Figure 2:
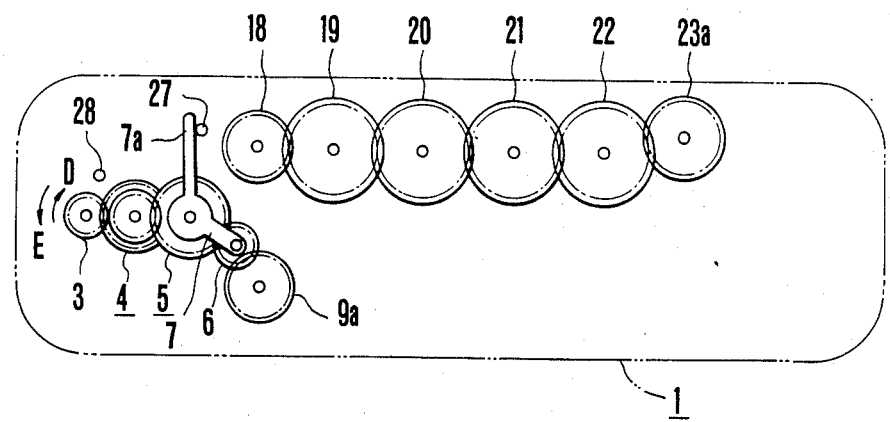
FIG. 2 is a plan view showing the bottom side of the electrically-driven camera.
Figure 4:
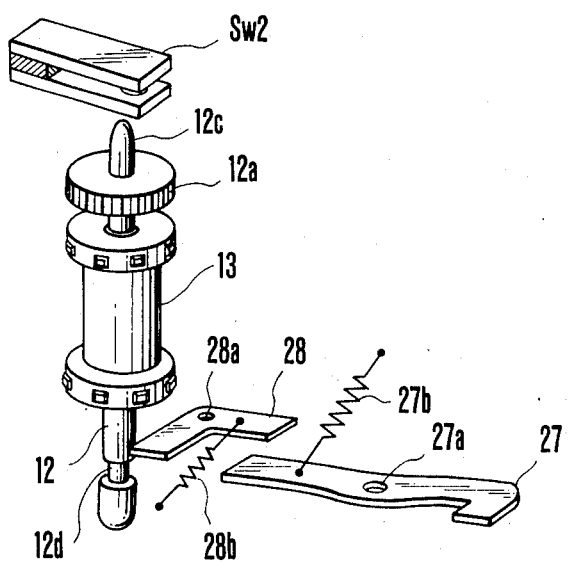
FIG. 4 is an oblique view showing carrying means for carrying a rewinding shaft of the same camera.

Referring to FIGS. 1 and 2 high show an electrically-driven single-lens reflex camera, the camera is provided with an outer casing 1; a motor 2 incorporated in the camera with a pinion 3 secured to the output shaft 2a of the motor while the motor 2 is rigidly arranged within a casing (not shown); a double gear 4 consisting of a large diameter gear 4a and a small diameter gear 4b, the gear 4 being rotatably carried within the above-stated casing and engaged with a pinion gear 3; a sun gear 5 which has a shaft part 5a rotatably carried within the above-stated casing and a gear part 5b engaging the above-stated small diameter gear 4b, a flange part 5c being secured to the lower end of the shaft part 5a; and a planet gear 6 rotatably carried by a planet arm 7 which pivotally engages the shaft part 5a. The planet arm 7 is provided with an arm part 7a. The turning angle of the planet arm 7 is restricted through the arm part 7a by stopper pins 27 and 28. In between the flange 5c of the sun gear 5 and the planet arm 7 is interposed a compression spring 8 which imparts a revolving force to the planet gear 6. A winding shaft 9 is rotatably carried by the casing. A low winding gear 9a is secured to the lower part of the winding shaft 9 and is arranged to engage the planet gear 6. Meanwhile, an upper winding gear 9b is secured to the upper part of the shaft 9. In addition to that, a winding stop cam 9c which is provided with a notch 9d is also secured to the upper part of the shaft 9. A mirror releasing pin 9e is disposed on the winding stop cam 9c. A winding stop lever 10 is pivotally carried within the casing and is urged by a spring 11 to turn counterclockwise as viewed on the drawing. The lever 10 is provided at one end thereof with a claw part 10a which is arranged to be capable of engaging the notch 9d of the cam 9c. The other end 10b of the winding stop lever 10 is arranged to shift the position of a winding change-over switch SW1. Under a condition of having completed a charging and film winding process, the winding stop lever 10 has the claw part 10a thereof engaging the notch part 9d of the cam 9c as shown in FIG. 1. Under that condition, therefore, the movable contact piece C and contact piece R of the winding change-over switch SW1 are in a closed state. However, when a mirror of the camera (not shown) is driven by a shutter release operation, the winding stop lever 10 is turned clockwise in the direction of arrow A. This causes the movable contact piece C of the switch SW1 to move away from the contact piece R and comes to form in a closed state with another contact piece W. A rewinding button shaft 12 which is arranged as shown in more detail in FIG. 4 is fitted in a hollow shaft of a sprocket 13 which is rotatably carried by the above-stated casing. To the upper part of the shaft 12 is secured a sprocket gear 12a which is engaging the above-stated upper winding gear 9b. The shaft 12 has a clutch pin 12b secured to the middle part thereof. The clutch pin 12a is arranged to be capable of engaging a clutch groove 13a of the sprocket 13. The rewinding button shaft 12 is provided further with an insulative projection member 12c which is disposed on the upper end thereof. The rewinding button shaft 12 is constantly urged by known means to move downward to keep i s clutch pin 12b in engagement with the clutch groove 13a of the sprocket 13. In rewinding the film, when the photographer or operator pushes up the rewinding button shaft 12 by means of an operation member (not shown), the clutch pin 12b is disengaged from the clutch groove 13a and, at the same time, the above-stated projection member 12c closes a switch SW2 Then, a stepped part 12d of the rewinding button shaft 12 engages a lever 28 which is caused to turn clockwise on its shaft 28a by a spring 28b. As a result, the rewinding button shaft 12 is kept in the state of being pushed upward. Under this condition, the switch SW2 is kept closed. Referring to FIG. 4, a lever 27 is in a state as shown when the back cover of the camera is closed. When the back cover is opened, the urging force of a spring 27b causes the lever 27 to turn clockwise. This in turn causes the lever 28 to turn counterclockwise and the stepped part 12d is disengaged from the lever 28. With the back cover opened, the rewinding button shaft 12 comes down from the uplifted position. The clutch pin 12b comes to engage the clutch groove 13a while the switch SW2 is opend.

A winding spool 14 is arranged coaxially with the motor 2 and is rotatably carried by the above-stated casing. A spool gear 16 is coupled via a friction clutch 15 with the winding spool 14. The spool gear 16 engages the above-stated sprocket gear 12a.

A mirror release lever 17 is arranged to be moved at the time of film winding by the mirror release pin 9e of the winding stop cam 9c in the direction of arrow B to unlock thereby a mirror release mechanism (not shown).

Figure 3:
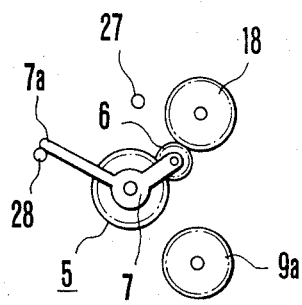
FIG. 3 is an illustration of a planetary gear part of the same camera showing it as in a film rewinding state.

A first rewinding gear 18 is rotatably carried by the above-stated casing. At the time of film rewinding, the first rewinding gear 18 comes to engage tne above-stated planet gear 6 in a manner as shown in FIG. 3. The gear 18 is thus transmissibly connected to a second rewinding gear 23a via intermediate gears 19, 20, 21 and 22 which are also rotatably carried by the casing. A rewinding connection shaft 23 is rotatably carried by the casing. The above-stated second rewinding gear 23a is secured to the lower end of the connection shaft 23 while a third rewinding gear 23b is secured to the upper end of the shaft 23. In FIG. 1, the intermediate gear 19 is shown as spaced from the lower winding gear 9a for the sake of illustration. Actually, however, they are in relative positions as shown in FIG. 2. The third rewinding gear 23b is transmissible connected to a rewinding fork gear 25 which is rotatably carried by the casing via an intermediate gear 24 which is also rotatably carried by the casing. The rewinding fork gear 25 has a rewinding fork 25a secured to the lower end thereof and is arranged to engage a film cartridge 26 via the rewinding fork 25a.

The camera which is arranged as described above as an embodiment of the present invention operates as follows: Assuming that the electrically-driven camera is in a state of having completed a film winding operation the winding and rewinding mechanisms are in the condition as shown in FIGS. 1 and 2. More specifically, the claw part 10a of the winding stop lever 10 is in a state of engaging the notch part 9d of the winding stop cam 9c; the clutch pin 12b of the rewinding button shaft 12 is engaging the clutch groove 13a of the sprocket 13; the switch SW2 is open; and the planet gear 6 is engaging the lower winding gear 9a.

Under this condition, when a shutter release button (not shown) is depressed, known mirror driving means drives a mirror to retract it from a view finder forming position thereof. Then, in association with the retracting action, the winding stop lever 10 is pushed in the direction of arrow A and turns clockwise against the force of the spring 11. The claw part 10a of the lever 10 disenageges from the notch part 9d of the winding stop cam 9c. The movable contact piece C and contact piece W of the winding change-over switch SW1 then come into contact with each other.

Following that, an exposure is effected by known exposure control means. Upon completion of the travel of the trailing curtain of a shutter (not shown), a switch SW3 (not shown) which is in association with the trailing curtain of the shutter closes. The motor 2 rotates forward. The pinion 3 which is provided on the output shaft 2a of the motor 2 then turns in the direction of arrow D or clockwise as viewed on FIG. 2. The sun gear 5 is caused to turn clockwise via the double gear 4. Since the planet gear 6 is in the state as shown in FIG. 2 at that instant as mentioned in the foregoing, the clockwise revolution of the planet gear 6 is prevented by the stopper pin 27. Therefore, the planet gear 6 makes a rotation.

The rotation of the planet gear 6 is transmitted to the sprocket 13 via the lower winding gear 9a, the upper winding gear 9b and the sprocket gear 12a. The rotation is also transmitted to the winding spool 14 via the spool gear 16 and the friction clutch 15. As a result, the film is wound up. In the initial stage of the film winding process, the mirror release pin 9e turns clockwise together with the winding stop cam 9c. This pushes the mirror release lever 17 in the direction of arrow B to free the mirror. Meanwhile, the shutter, etc. are charged by some known means. Further, in this specification, an aperture adjusting mechanism, the shutter, etc. which are to be driven for the purpose of exposing the film to light are inclusively called film exposing means; and a charging action on the aperture adjusting mechanism, the shutter, etc. is called charging the film exposing means. When a film winding process comes to an end with the winding shaft 9 having made one turn, the force of the spring 11 causes the winding stop lever 10 to turn counterclockwise to bring the claw part 10a of the lever 10 into contact with the notch part 9d of the winding stop cam 9c. At that time, however, no force is developed in the direction of arrow A as the mirror driving mechanism is charged. Upon completion of charging and film winding, the above-stated trailing curtain related switch SW3 opens in association with the movement of the winding stop lever 10. Meanwhile, the winding operation is mechanically brought to a stop by the engagement of the claw part 10a of the winding stop lever 10. At the same time, the movable contact piece C of the winding change-over switch SW1 moves away from the contact piece W and comes into contact with the other contact piece R. This cuts off power supply to the motor 2 and thus brings the film winding operation to an end.

After that, a next frame portion of film is exposed to light when the shutter release button (not shown) is again pushed by the photographer.

With respect to the film rewinding operation of the embodiment, let us first describe a case where a roll of film comes to the end thereof halfway in a film winding process with a length of film corresponding to a given number of frames having already been fed and wound up. In that event the rewinding operation is performed as follows: When the rewinding button shaft 12 is pushed up by means of the operation member (not shown), the rewinding button shaft 12 is kept in the uplifted state as mentioned in the foregoing. The clutch pin 12b of the shaft 12 is disengaged from the clutch groove 13a of the sprocket 13. The projection member 12c of the shaft 12 then closes the switch SW2. Then, since the motor 2 has been stopped halfway in the winding process, a circuit operation which will be described later herein cause the motor 2 to again rotate forward to resume the winding process. In this instance, however, the clutch pin 12b and the clutch groove 13a of the sprocket 13 are in a state of being disengaged from each other as the winding process has not been completed. Therefore, the sprocket 13 does not turn to wind up the film. As a result, with the winding process resumed, it is solely the mechanisms related to the mirror and the shutter that are charged. Upon completion of this charging action, the claw part 10a of the winding stop lever 10 comes to engage the notch part 9d of the winding stop cam 9c in the same manner as in the case of the normal winding process described in the foregoing. Then, the movable contact piece C of the winding change-over switch SW1 moves away from the contact piece W and comes into contact with another contact piece R. At the same time, the trailing curtain related switch SW3 comes to open. Following that, a circuit action which will be described later causes the motor 2 to begin to rotate in the reverse direction after the lapse of a predetermined period of time.

With the motor thus caused to reversely rotate, the pinion 3 turns (counterclockwise) in the direction of arrow E as shown in FIG. 2. This causes, via the double gear 4, the sun gear 5 to turn counterclockwise. The compression spring 8 then exerts a revolving force which causes the planet gear 6 to revolve and the planet arm 7 to turn counterclockwise. The arm part 7a of the arm 7 then abuts on the stopper pin 28 as shown in FIG. 3 and the planet gear 6 comes to engage the first rewinding gear 18. Since the planet arm 7 is stopped from turning in that state, the planet gear 6 begins to rotate instead of revolving. Accordingly, the rotation of the planet gear 6 is transmitted to the film cartridge via the first rewinding gear 18, the intermediate gear 19-22, the second rewinding gear 23a, the third rewinding gear 23b, the intermediate gear 24, the rewinding fork gear 25 and the rewinding fork 25a. A film rewinding operation is thus accomplished. Upon completion of the film rewinding operation, a known rewinding completion switch SW4 opens to cut off power supply to the motor 2 and thus to bring the rewinding operation to an end. The switch SW4 is arranged, for example, on a film feeding rail to open when the film disappears from a film passage.

The film rewinding operation of the embodiment when the camera is in a state of having completed a film winding process is as follows: In this case, as will be further described in the description of circuit operations, unlike the above-described case, the winding operation is not performed on an unfinished portion of a winding process. When the rewinding button shaft 12 is pushed up by means of the operation member, therefore, the rewinding operation will be immediately performed.

Further, in winding up a new roll of film loaded after completion of the rewinding operation, the motor 2 rotates forward and the pinion 3 turns in the direction of arrow D. Then, the revolving force of the compression spring 8 causes the planet gear 6 to revolve counterclockwise. Then, a winding process is accomplished after the planet gear 6 comes to engage the lower winding gear 9a as shown in FIG. 2.

The circuit of the electrically-driven camera which is arranged as an embodiment of the invention as has been described in the foregoing is arranged as shown in FIG. 5. Referring now to FIG. 5, the circuit arrangement includes the above-stated switch SW2 which has one terminal thereof grounded and the other connected to the positive side of a power source 101 via a resistor R1. A middle point between the switch SW2 and the resistor R1 is connected via an inverter 107 to an AND gate 110 and also via another inverter 108 to another AND gate 111.

The trailing curtain related switch SW3 which is arranged to turn on upon completion of the travel of the trailing shutter curtain and to turn off upon completion of charging has one terminal thereof grounded and the other connected via a resistor R2 to the positive side of the power source 101. A middle point between the switch SW3 and the resistor R2 is connected to an AND gate 109 via a first timer 102 and an inverter 104. The first timer 102 is provided for the purpose of preventing a battery from being consumed by continuous power supply the the motor 2 when the motor is stopped from driving by the tension of the film with the film coming to the end thereof halfway in a film winding process. Upon receipt of a low level input, the first timer 102 counts a predetermined length of time which is longer than a period of time required for a normal winding process. The output level of the first timer 102 changes from a low level to a high level after the lapse of the predetermined length of time. Further, the first timer 102 is reset and produces a low level output when a high level input is supplied thereto.

The middle point between the switch SW3 and the resistor R2 is further connected via an inverter 105 to the AND gate 109 and also, via an inverter 106, to the AND gate 110. In addition to that, the middle point is connected via a second timer 103 to the AND gate 111. The second timer 103 is provided for the purpose of temporarily stopping the motor 2 in case that the motor 2 is to be rotated forward and backward in a continuous manner. The second timer is also arranged, in the same manner as the first timer, to change its output level from a low level to a high level after the lapse of the predetermined length of time. The output terminals of the above-stated AND gates 109 and 110 are connected to an OR gate 112. The output terminal of the OR gate 112 is connected via an inverter 113 and a resistor R3 to the base of a winding transistor Tr1. The output terminal of the AND gate 111 is connected via a resister R4 to the base of a rewinding transistor Tr2. The winding transistor Tr1 has its emitter connected to the positive side of the power source 101 and its collector to the collector of the rewinding transistor Tr2 and to one terminal of the motor 2. The emitter of the rewinding transistor Tr2 is grounded via a rewinding completion switch SW4. The other terminal of the motor 2 is connected to the movable contact piece C of the winding change-over switch SW1. The contact pieces R and W of the switch SW1 are respectively connected to the positive and negative sides of the power source 101. A diode D1 for braking is connected between the emitter and collector of the winding transistor Tr1.

The circuit which is arranged as described above operates as follows:

When the camera is in a state of having completed a film winding operation, each of the switches is in a state as shown in FIG. 5. The winding change-over switch SW1 has the movable contact piece C in contact with the contact piece R. The switch SW2 and the switch SW3 associated with the trailing curtain are open and the rewinding completion switch SW4 is closed. When the shutter release button (not shown) is pushed under this condition, the mirror is driven and the movable contact piece C of the winding change-over switch SW1 moves away from the contact piece R and comes into contact with another contact piece W. In this instance, however, power supply is not effected to the motor 2 as other switches SW2 and SW3 are open.

When the trailing curtain of the shutter travels after completion of an exposure, the switch SW3 associated with the trailing curtain closes and the first timer 102 begins to count. However, as mentioned in the foregoing, the output of the timer remains at a low level until completion of the count. Therefore, the output level of the timer is inverted by the inverter 104 and a high level input is supplied to the AND gate 109. Further, the switch SW3 causes a low level input to be supplied to the inverted 105. The input level is inverted by the inverter 105 and a high level input is supplied to the AND gate 109 from the inverter 105. Accordingly, the output level of the AND gate 109 becomes high. Therefore, the output level of the OR gate 112 becomes high and the output level of the inverter 113 low. As a result of this, base current flows via the resistor R3 to turn on the winding transistor Tr1. With the transistor Tr1 turned on, current flows as follows: The positive side of the power source 101→the transistor Tr1→the motor 2→the movable contact piece C and contact piece W of the switch SW1→the negative side of the power source 101. The motor 2 then rotates forward to perform a winding action. In this instance, since the switch SW2 is open, an input which comes via the inverter 108 to the AND gate 111 is at a low level. Therefore, the output level of the AND gate 111 is also low and does not turn on the rewinding transistor Tr2. Further, the output of the AND gate 110 obtained via the inverter 107 is also at a low level. Upon completion of a winding operation, the movable contact piece C of the winding change-over switch SW1 moves away from the contact piece W and comes to another contact piece R as mentioned in the foregoing. Concurrently with this, the switch SW3 associated with the trailing curtain opens. The input via the inverter 105 to the AND gate 109 then becomes a low level. The output level of the AND gate 109 thus becomes low. Further, the level of the input via the inverter 106 to the AND gate 110 becomes low to make the output level of the AND gate 110 low. Accordingly, the input level of the OR gate 112 also becomes low to make the output level of the OR gate 112 low. The output level of the inverter 113 becomes high and the transistor Tr1 turns off. As a result, there is formed a short-circut as follows: the motor 2→the diode D1→the contact piece R and movable contact piece C of the switch SW1→the motor 2. This applies electrical brake to the motor 2 to quickly bring it to a stop.

After that, if the film comes to the end thereof halfway in the film winding process with a length of film corresponding to a predetermined number of frames having been fed, the circuit of the embodiment operates as follows: In that event, the movable contact piece C of the switch SW1 comes into contact with the contact piece W in the same manner as in the case of the normal operation described in the foregoing. Further, with the switch SW3 closed in response to the travel of the trailing curtain of the shutter, the transistor Tr1 turns on. The motor 2 then rotates forward to perform a winding action. However, when the film comes to the end thereof halfway in the winding process, the tension of the film which then develops mechanically brings the motor 2 to a stop. While the motor 2 is thus stopped, the output level of the first timer 102 changes from a low level to a high level after the lapse of a predetermined length of time from the start of the winding process. Then, the level of the input via the inverter 104 to the AND gate 109 becomes low to make the output level of the AND gate 109 low. The output level of the inverter 113 thus becomes high. The transistor Tr1 turns off to cut off power supply to the motor 2.

Then, in carrying out a rewinding operation, the operation member (not shown) is operated to push up the rewinding button shaft 12 as mentioned in the foregoing description of the mechanisms. With the rewinding button shaft 12 pushed up, the switch SW2 closes. The level of the input coming via the inverter 107 to the AND gate 110 becomes high. However, since the camera is still halfway in the winding process, the switch SW3 is in a closed state. Therefore, the input coming via the inverter 106 to the AND gate 110 is at a high level. Accordingly the output level of the AND gate 110 is high. The output level of the OR gate 112 also becomes high. The output level of the inverter 113 becomes low to cause the transistor Tr1 to turn on to have current flow in the following manner: The positive side of the power source 101→the transistor Tr1→the motor 2→the movable contact piece C and contact piece W of the switch Sw1→the negative side of the power source 101. As a result, the motor 2 rotates forward to finish the unfinished charging portion of the winding process. Upon completion of the winding process, the switch SW1 has its movable contact piece C come into contact with the contact piece R and the switch SW3 opens. Then, the input coming via the inverter 105 to the AND gate 109 becomes a low level to make the output level of the AND gate 109 low. The input coming via the inverter 106 to the AND gate 110 becomes a low level to make the output level of the AND gate 110 also low. The output level of the OR gate 112 becomes low and the output level of the inverter 113 high. The transistor Tr1 thus turns off to bring the motor 2 to a stop. Further, with the switch SW3 opened, the second timer 103 performs counting. The output level of the second timer 103 becomes high upon completion of the count. Further, since the switch SW2 is closed, the input coming via the inverter 108 to the AND gate 111 is at a high level. Therefore, the output level of the AND gate 111 becomes high to turn on the transistor Tr2. With the transistor Tr2 turned on, current flows in the following manner: The positive side of the power source 101→the contact piece R and movable contact piece C of the switch SW1→the motor 2→the transistor Tr2→the switch SW4→the negative side of the power source 101. This flow of current causes the motor 2 to reversely rotate for film rewinding. Upon completion of the film rewinding operation, the switch SW4 opens to bring the motor to a stop. Further, in case of a film rewinding operation on the camera with the camera in a state of having completed film winding, the level of the input coming via the inverter 108 to the AND gate 111 becomes high at the point of time when the switch SW2 is closed with the rewinding button shaft 12 pushed up; then, since the switch SW3 has already closed in response to completion of the film winding operation, the output level of the second timer 103 also has been high. Therefore, the output level of the AND gate 111 thus becomes high. The transistor Tr2 turns on for film rewinding.

Further, in the case where the film is rewound after finishing the unfinished charging portion of the winding process as mentioned above, the second timer 103 serves to detain the motor 2 in a stopped state for a predetermined period of time before the rotation of the motor 2 is shifted from the forward rotation to the reverse rotation. This arrangement serves to lengthen the service life of the motor.

As apparent from the foregoing description, in accordance with the invention, in case that the film comes to the end thereof halfway in a winding process, an automatic film rewinding operation is allowed to be carried out after the unfinished charging portion of the winding process is finished by a very simple operation of just pushing up the rewinding button shaft. This improves the operability of the camera. Further, in the case of a single-lens reflex camera, the mirror of the camera never be left in the retracted position. Besides, the internal mechanisms of the camera can be prevented from being left under unnecessary load as the camera can always be set into a state of having completed a winding process.

What I claim:

1. An electro-driven camera comprising:
   (a) driving means for carrying out film winding through a film winding system mechanism, mechanical charging through a mechanical charging system mechanism and film rewinding through a film rewinding system mechanism;
   (b) a control member arranged to move by said mechanical charging system mechanism when said driving means causes the film to be wound, said member taking a first state when the charging is completed, and a second state when an exposure starts;
   (c) a first changeover switch operatively connected to said control member and responsive to setting of said control member in the first state for causing said driving means to operate in the film rewind mode, and to setting of said control member in the second state for causing said driving means to operate in the film wind mode;
   (d) a system for transmitting the driving power of said driving means either to said film winding system mechanism and said mechanical charging system mechanism, or to said film rewinding system mechanism;
   (e) a manually operable actuator member for setting said transmitting system in a state where the driving power of said driving means is not transmitted to said film winding system; and
   (f) a second switch arranged to change its position when said manually operable actuator member is operated, whereby said driving means is caused to operate by changing the position of said switch.

2. An electro-driven camera according to claim 1, wherein said control member comprises:
   (a) a cam arranged to rotate when a gear to which the driving power of said driving means is transmitted rotates, said cam having a cutout in a portion of the periphery thereof and being arranged to assume a prescribed position when the charging is completed and to be taken out of said prescribed position when an exposure starts; and
   (b) a lever arranged to contact with said first changeover switch and said cam, said lever assuming a second state when out of engagement in said cutout and a first state when in engagement with said cutout.

* * * * *